US007414196B2

(12) United States Patent
Chawgo et al.

(10) Patent No.: US 7,414,196 B2
(45) Date of Patent: Aug. 19, 2008

(54) CASING FOR RF FILTER

(75) Inventors: Shawn Chawgo, Liverpool, NY (US); Noah Montena, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 476 days.

(21) Appl. No.: 11/151,250

(22) Filed: Jun. 13, 2005

(65) Prior Publication Data

US 2006/0279911 A1 Dec. 14, 2006

(51) Int. Cl.
*H02G 15/02* (2006.01)

(52) U.S. Cl. ................ 174/74 R; 174/75 R; 174/75 C; 174/76

(58) Field of Classification Search ............... 174/74 R, 174/77, 84 R; 333/175, 185
See application file for complete search history.

(56) References Cited

U.S. PATENT DOCUMENTS

| | | | | |
|---|---|---|---|---|
| 4,296,390 | A | 10/1981 | Vanderheyden et al. | |
| 4,701,726 | A * | 10/1987 | Holdsworth | 333/185 |
| 5,151,054 | A | 9/1992 | Briones et al. | |
| 5,578,525 | A * | 11/1996 | Mizukoshi | 333/175 |
| 5,630,734 | A | 5/1997 | Phillips, Jr. | |
| 6,165,019 | A | 12/2000 | Kha et al. | |
| 6,429,754 | B1 | 8/2002 | Zennamo, Jr. et al. | |
| 6,560,087 | B1 | 5/2003 | Zennamo, Jr. et al. | |
| 6,636,129 | B2 | 10/2003 | Zennamo, Jr. et al. | |
| 6,674,342 | B2 | 1/2004 | Zennamo, Jr. et al. | |
| 6,791,436 | B2 | 9/2004 | Zennamo, Jr. et al. | |
| 6,794,957 | B2 | 9/2004 | Shafer et al. | |
| 2002/0196102 | A1* | 12/2002 | Zennamo et al. | 333/175 |
| 2004/0196118 | A1 | 10/2004 | Maguire et al. | |
| 2004/0227589 | A1 | 11/2004 | Panetta et al. | |
| 2005/0001697 | A1* | 1/2005 | Gould et al. | 333/185 |
| 2005/0164525 | A1* | 7/2005 | Benson et al. | 439/63 |

* cited by examiner

*Primary Examiner*—William H Mayo, III
(74) *Attorney, Agent, or Firm*—Christopher R. Pastel; Pastel Law Firm

(57) ABSTRACT

An RF filter casing includes an internal frame, first and second interface ends connected to the frame, and a protective casing connected to the internal frame and to the first and second interface ends. The internal frame includes a support structure for multiple bosses which support a circuit board and provide ground connection for at least one circuit on the circuit board.

20 Claims, 9 Drawing Sheets

14
18
22
20
20
16
10
12

CASING FOR RF FILTER

FIELD OF THE INVENTION

This invention relates generally to the field of electronic filter assemblies used in the cable television (CATV) industry, and more particularly to structural features of such filter assemblies directed to providing improved electrical grounding of a filter circuit carried on a printed circuit board.

BACKGROUND OF THE INVENTION

In typical CATV applications, a filter circuit or network is provided to pass signals having frequencies within one or more specified bandwidths, sometimes with a desired amount of signal attenuation, while blocking signals of other frequencies. It is convenient, but not necessary, to mount the electrical components such as capacitors, inductors, and resistors on one or more printed circuit boards in essentially conventional fashion. The circuit board carrying the filter circuit components is mounted within a suitable protective housing. Physical rigidity is required to maintain stable electrical response.

The greatest obstacle to achieving optimum circuit performance is often proper grounding. Each section of the electrical component or circuit board requires a connection to ground. When the ground contact is placed at one end of the board, the electrical path from the circuit sections to the ground contact lengthens as the section components are placed farther away from the housing ground contact. Inductance and resistance parasitics are introduced into the electrical path in proportion to its length, i.e., the longer the path between the circuit section and the ground contact, the greater the level of undesirable inductance and resistance which are introduced. The additional inductance limits the circuit operating frequency range while the resistance severely degrades the “Q” (quality factor) of the circuit.

SUMMARY OF THE INVENTION

Briefly stated, an RF filter casing includes an internal frame, first and second interface ends connected to the frame, and a protective casing connected to the internal frame and to the first and second interface ends. The internal frame includes a support structure for multiple bosses which support a circuit board and provide ground connection for at least one circuit on the circuit board. The multiple bosses provide the ability to have short printed circuit traces to ground, thus minimizing parasitics.

According to an embodiment of the invention, an RF filter casing includes an internal frame; first and second interface ends connected to the frame; and a protective casing connected to the internal frame and to the first and second interface ends; the internal frame including a support structure for a plurality of bosses, wherein the plurality of bosses are effective for supporting a circuit board and for providing ground connection for at least one circuit on the circuit board.

According to an embodiment of the invention, an RF filter casing includes support means for supporting a plurality of bosses within the casing, wherein the plurality of bosses are effective for supporting a circuit board and for providing ground connection for at least one circuit on the circuit board; first and second interface means for electrically connecting the support means to external components; and protection means for protecting the at least one circuit from an external environment.

According to an embodiment of the invention, a method for assembling an RF filter casing includes the steps of providing an internal frame; providing a plurality of bosses on a portion of the internal frame; providing two interface ends; providing a protective outer casing; and when the internal frame and at least one of the interface ends are one-piece, press-fitting another of the interface ends and the protective outer casing onto the internal frame, such that mechanical and electrical connectivity is formed between the interface ends, the protective outer casing, and the internal frame; and when the internal frame and both interface ends are one-piece, press-fitting only the protective outer casing onto the internal frame such that mechanical and electrical connectivity is formed between the interface ends, the protective outer casing, and the internal frame.

DETAILED DESCRIPTION OF THE PREFERRED EMBODIMENT

Figure 1:
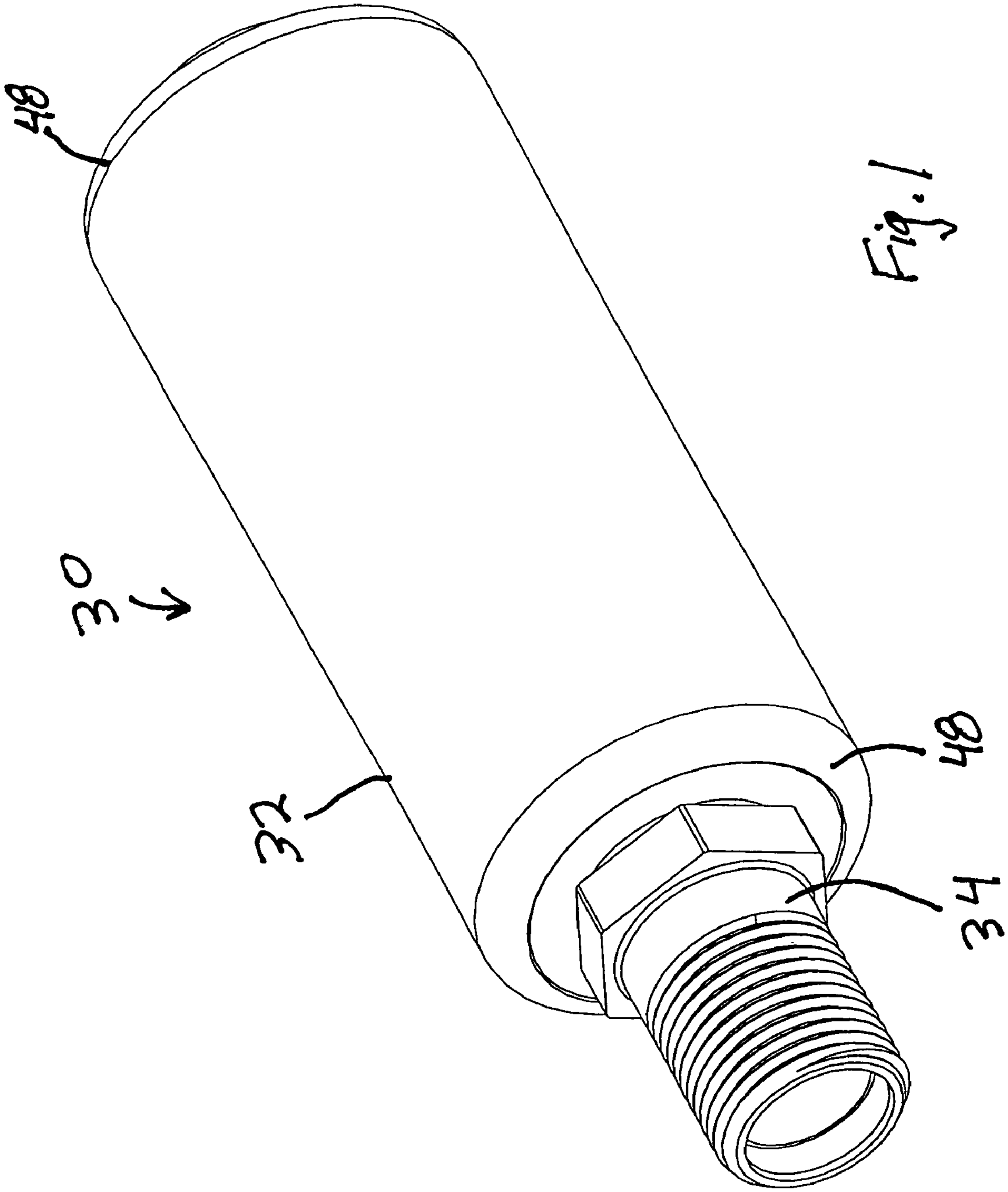
FIG. 1 shows an assembled view of a first embodiment of the present invention.
Figure 2:
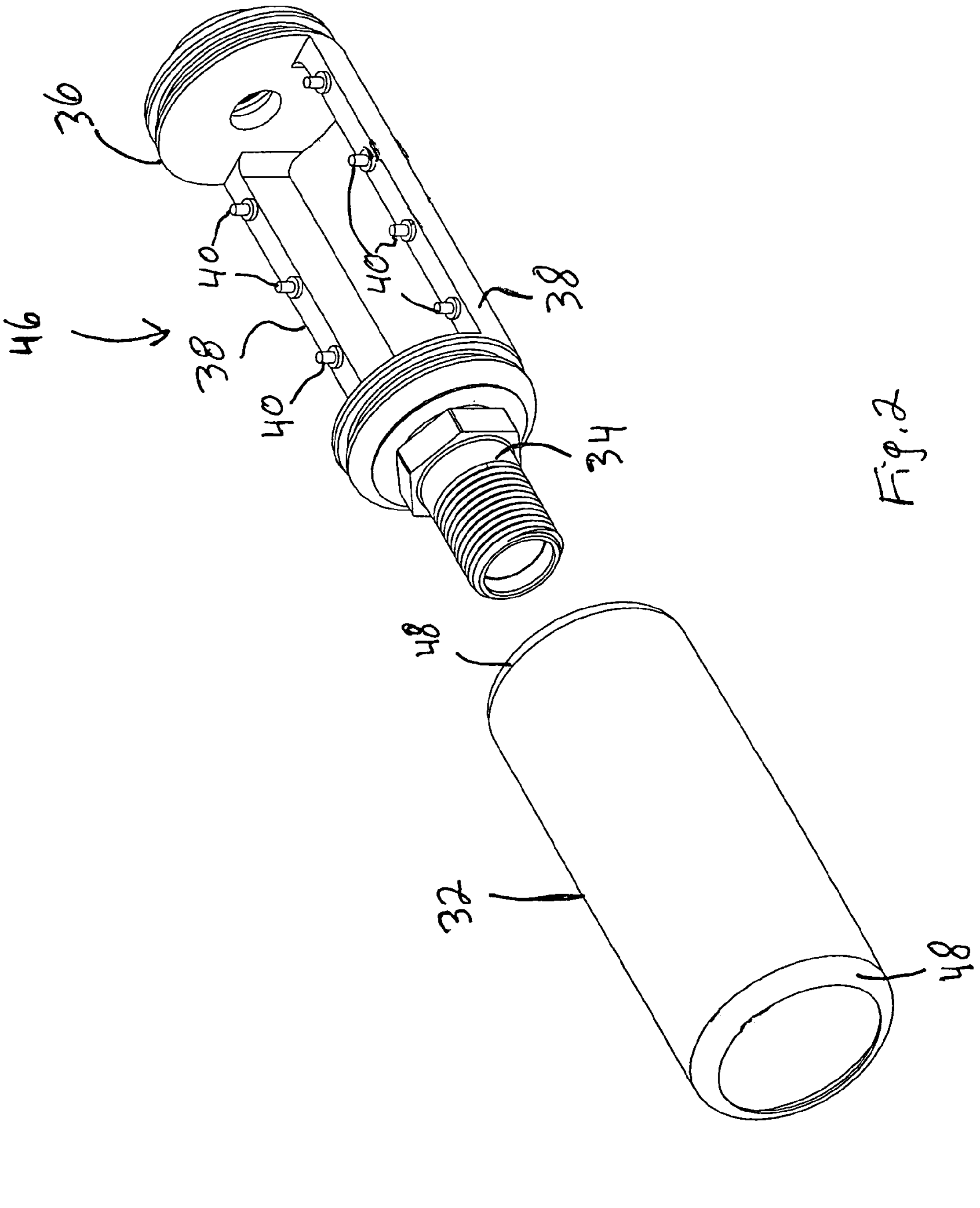
FIG. 2 shows a disassembled view of the first embodiment.
Figure 3:
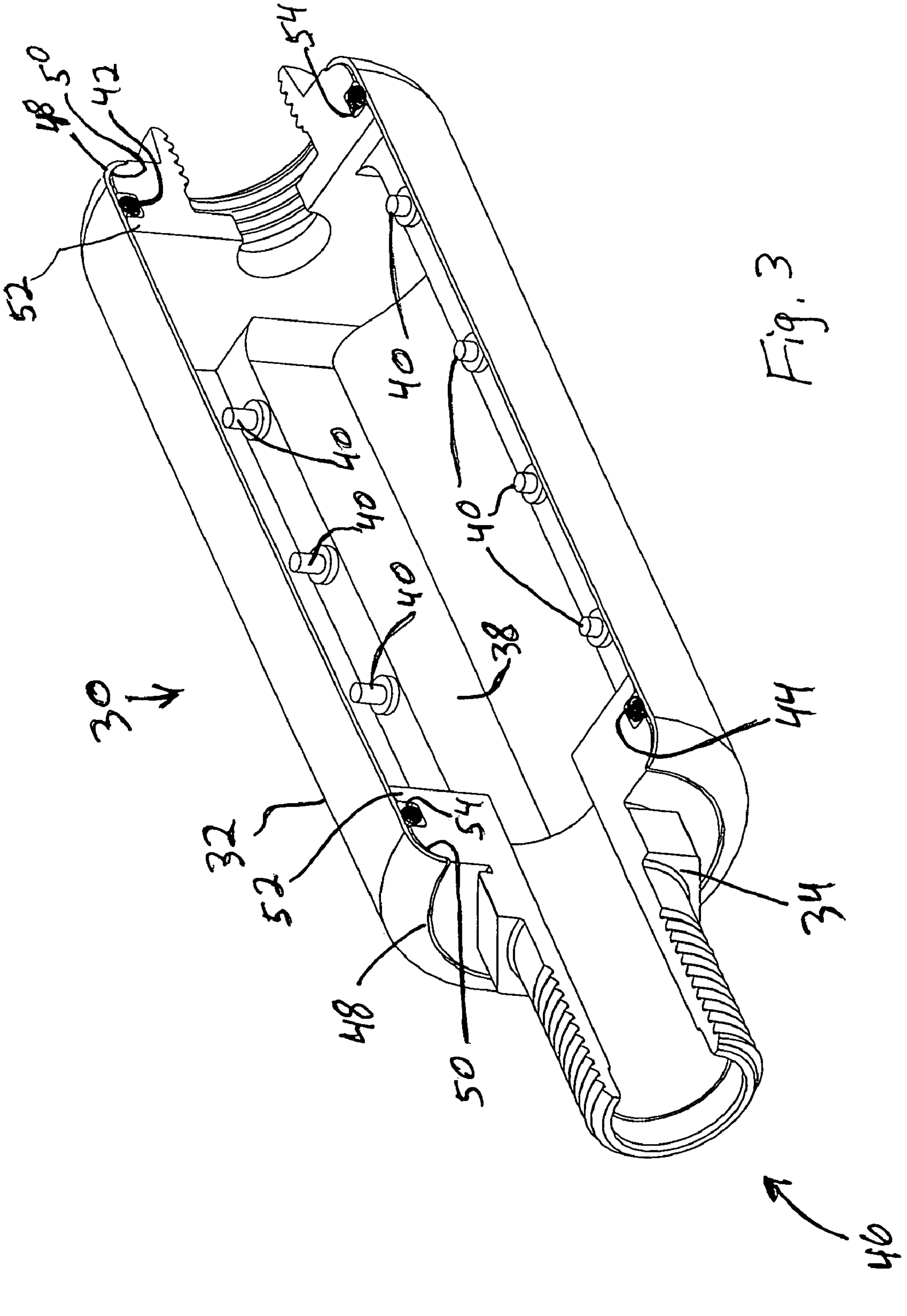
FIG. 3 shows a partially cutaway view of first embodiment.

The present invention is intended for supporting and housing in-line electronic devices for CATV systems which require physical rigidity for stability of response. Referring to FIGS. 1-3, a filter 30 includes a rigid frame 46 along with a plurality of interface ends 34 and 36 which are cast or machined integrally with rigid frame 46. Frame 46 is shown here with two beams 38, but other structures are possible as long as they provide the rigidity and support necessary to mount a plurality of bosses 40. A circuit board (not shown) containing at least one circuit (also not shown) is attached to bosses 40. Bosses 40 may be formed integrally with beams 38, may be press fit pins, or may be screws. The circuit board may be attached to bosses 40 by soldering, screwing, or press-fitting.

The unitary construction eliminates the possibility of variations in circuit response between manufacturing steps by eliminating the steps of assembling multiple parts. A protective casing 32 is placed over frame 46 and the ends are crimped over. Shielding and ground are provided by the press fit of protective casing 32 and portion 52 of frame 46. The ends 48 of protective casing 32 are formed to press fit over corresponding portions 50 of frame 46 to create shielding and seal. O-rings 42, 44 fit between grooves 54 formed by portions 50, 52 of frame 46 and form a seal with protective casing 32.

Frame 46 is rigid enough to resist flexing imparted by forces applied during crimping. Electrical response differences due to the presence of conductive protective casing 32 are anticipated during the tuning of the circuit on the circuit board by placing a temporary casing (not shown) with small holes just large enough to allow passage of tuning instruments.

Figure 4:
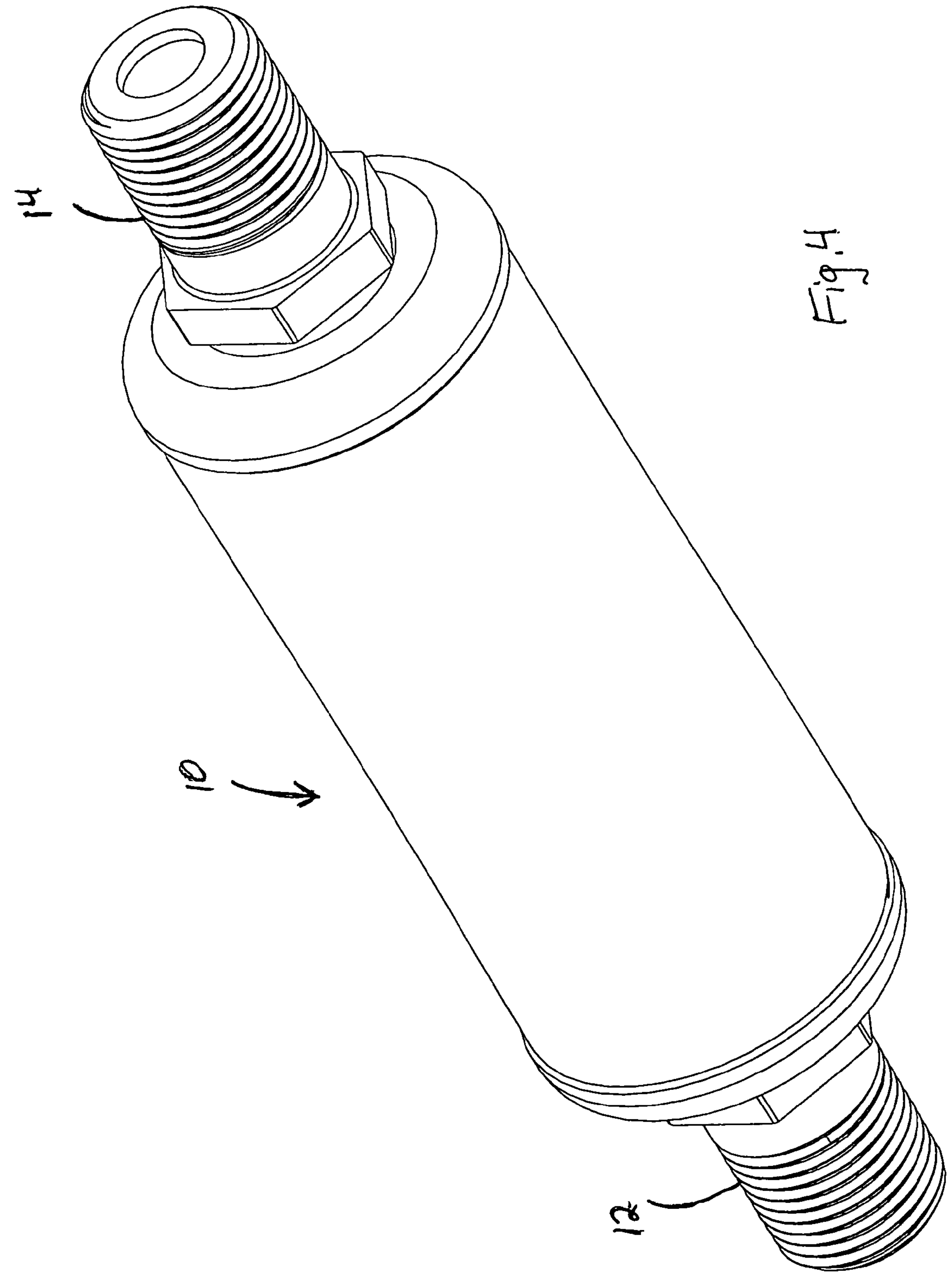
FIG. 4 shows an assembled view of a second embodiment of the present invention.
Figure 5:
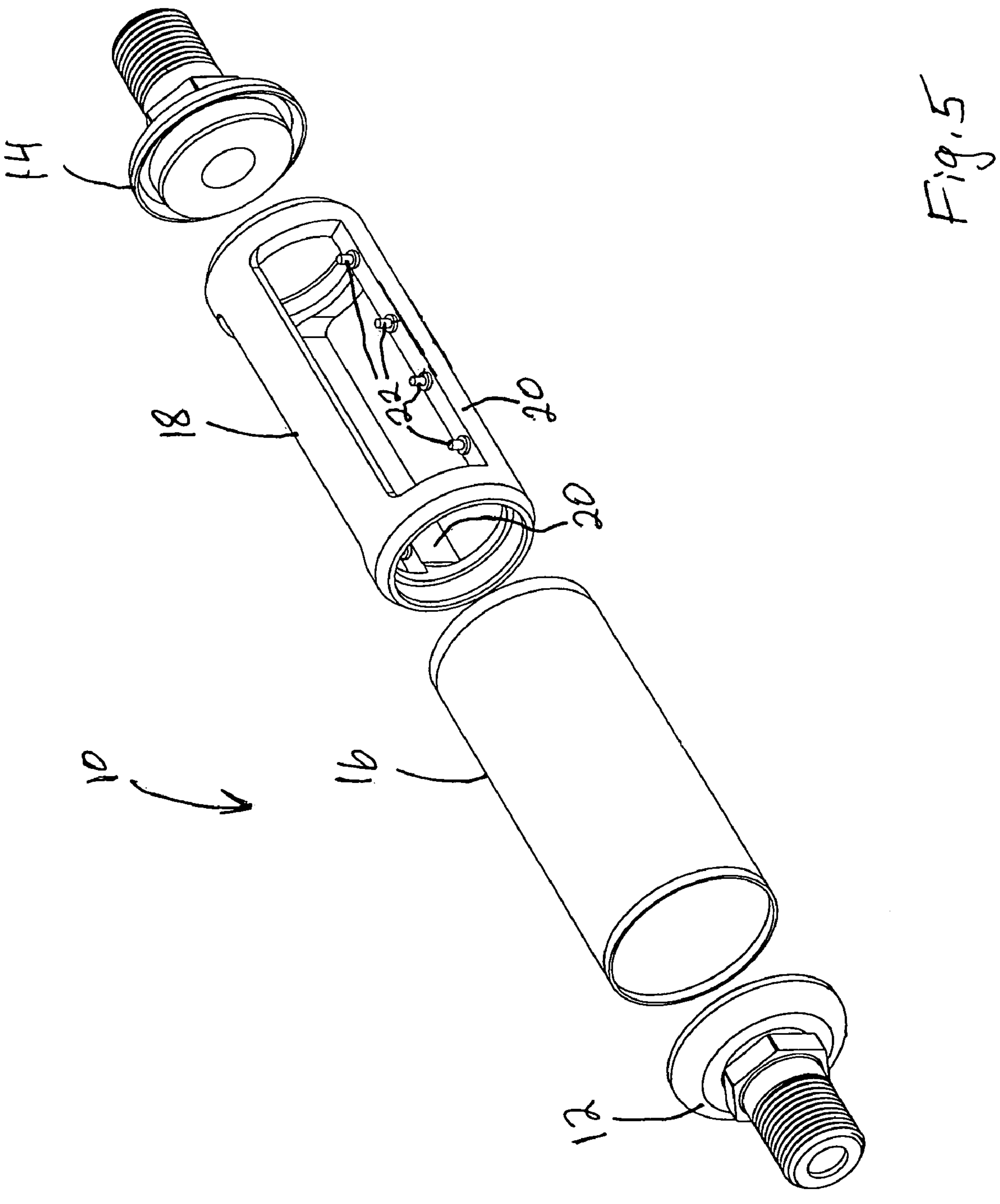
FIG. 5 shows a dissembled view of the second embodiment.
Figure 6:
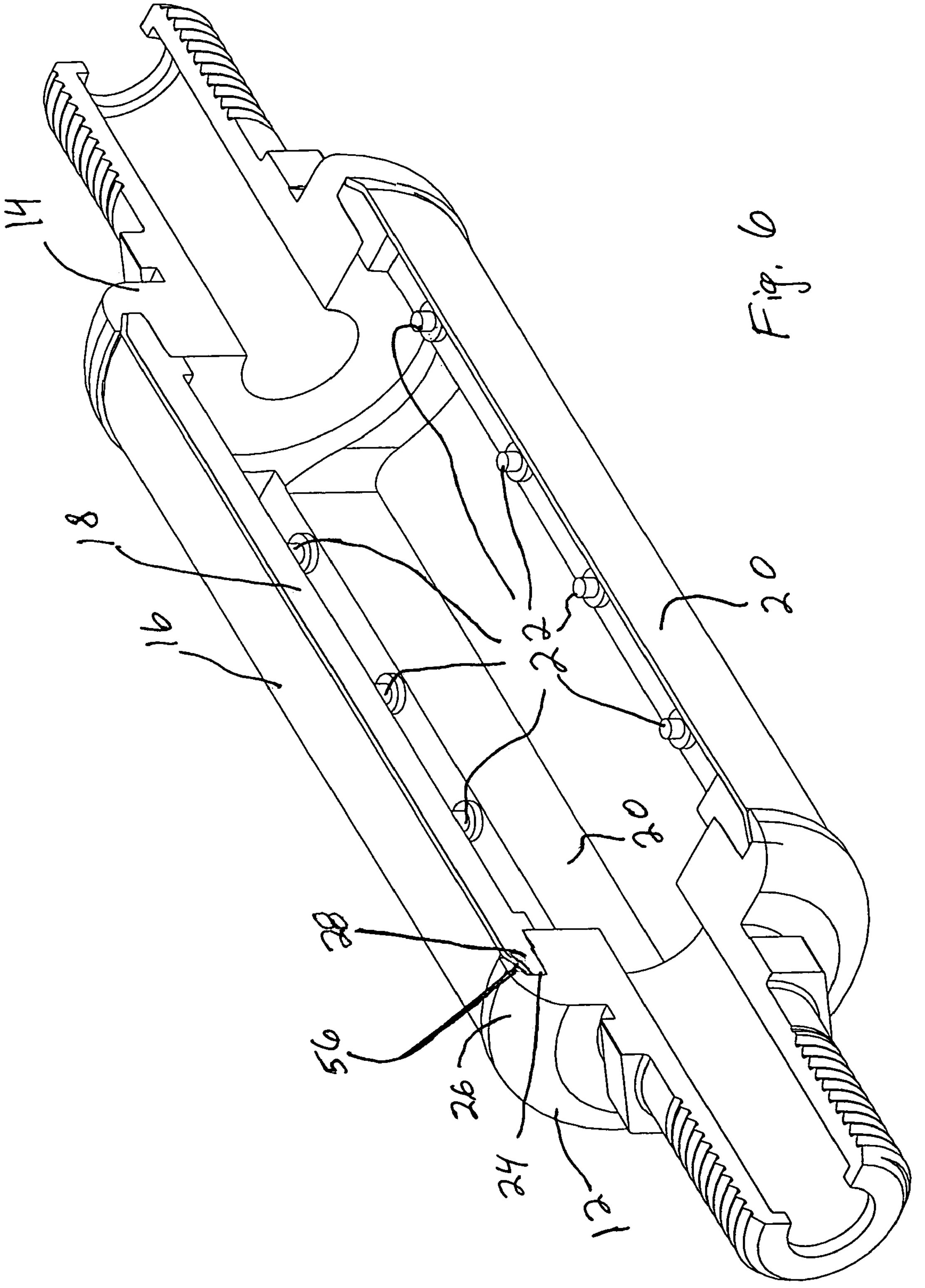
FIG. 6 shows a partially cutaway view of the second embodiment.

Referring to FIGS. 4-6, a second embodiment of a filter 10 is shown in which the construction of the frame is not unitary, but rather employs a central rigid inner frame 18 with changeable interface ends 12, 14. Frame 18 is optionally shaped with a plurality of beams 20 running lengthwise to provide mounting points, such as bosses 22, for a circuit board (not shown) with at least one circuit on it, as well as to provide axial and torsional rigidity, while still permitting physical access to board components for assembly and tuning of the circuit response. Other frame structures are possible as long as they provide the rigidity and support necessary to mount bosses 22. Bosses 22 may be formed integrally with beams 38, may be press fit pins, or may be screws. The circuit board may be attached to bosses 22 by soldering, screwing, or press-fitting.

Ends 12, 14 are preferably made as separate caps, thus opening a broader range of manufacturing methods than is possible with the unitary construction of the first embodiment, with the preferred method being machining from solid bar stock, independent of the method most suited for the center frame (die-casting). Separating the parts also allows for less complex sequences of assembly because it permits access to the board ends after they are attached to the frame, thus making attachment of the center conductor contacts to the board easier. Separating ends 12, 14 from inner frame 18 also permits design flexibility which allows various configurations, such as dual female, dual male, male/female, non F-type interfaces, etc., to be manufactured without requiring multiple dies for casting each configuration.

An outer shell 16 provides RF shielding and an environmental seal. Crimping outer shell 16 is accomplished simultaneously with pressing end parts 12, 14 into position on frame 18. As shown in FIG. 6, a header portion 26 preferably contains a groove 24 which receives a frame end 28 during the press-fit process. Header portion 26 forms and pinches outer shell 16 against frame end 28 to create the electrical ground and environmental seal. Header portion 26, shell 16, and frame end 28 form a mechanical interlock to hold the parts together. An elastomeric seal 56 is optionally employed to enhance the environmental seal.

Figure 7:
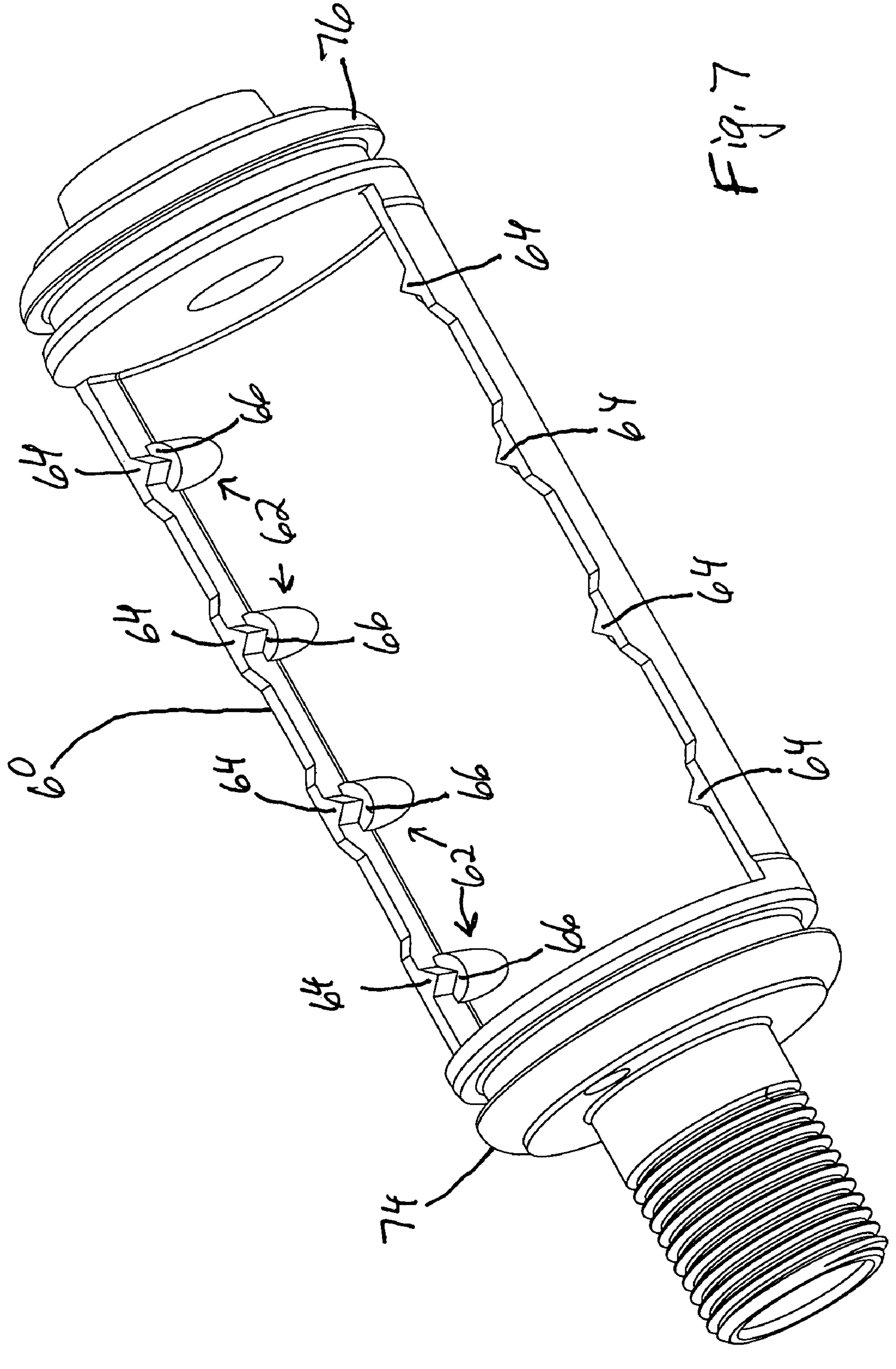
FIG. 7 shows a partially cutaway view of a third embodiment of the present invention.
Figure 8:
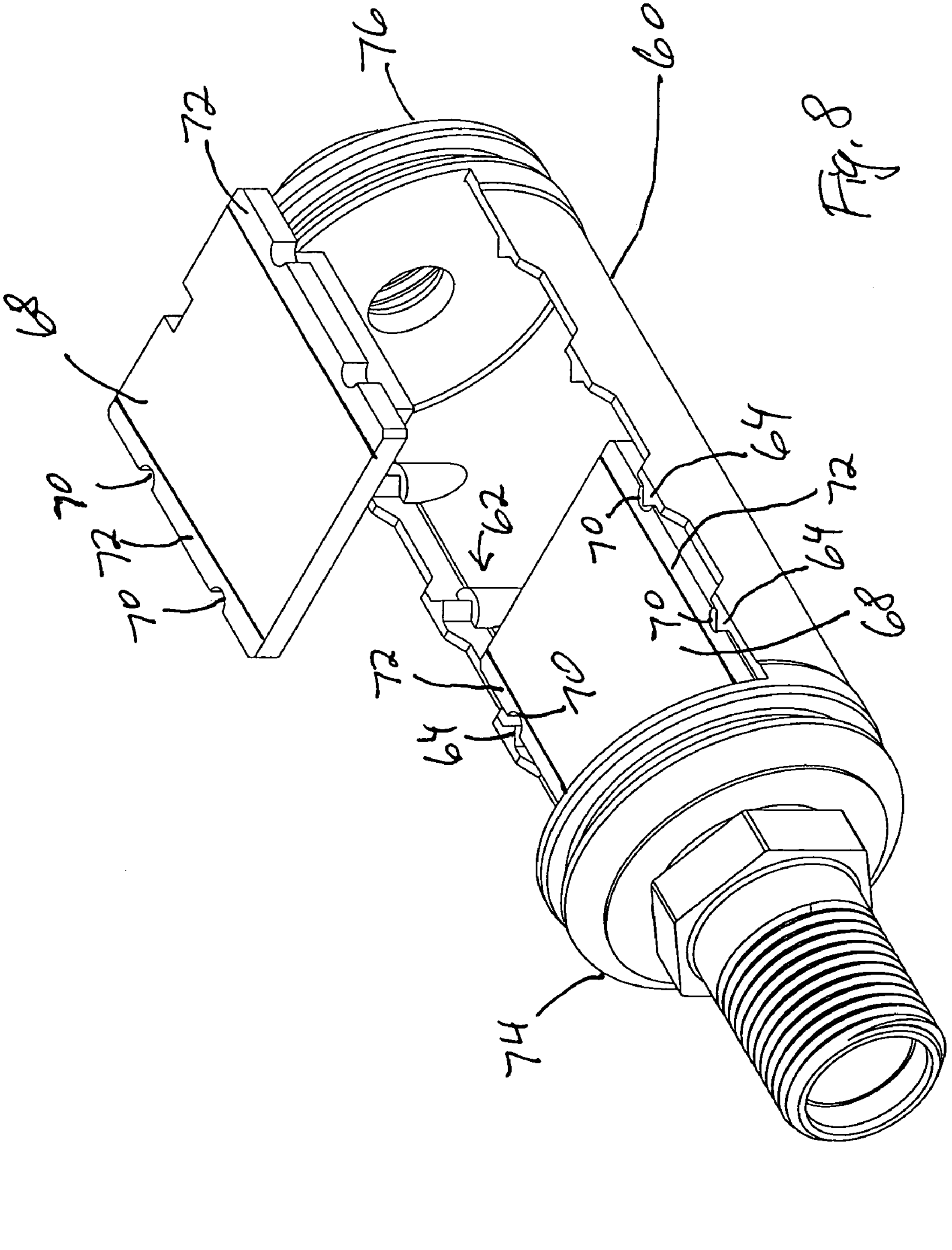
FIG. 8 shows a circuit board connected to the third embodiment.

Referring to FIGS. 7-8, a third embodiment of the invention is shown. A plurality of bosses 62 are preferably formed unitary with an inner frame 60, preferably by die-casting. Each boss 62 includes a triangular portion 64 and a flat portion 66. As seen best in FIG. 8, each circuit board 68 includes a plurality of notches 70 therein which correspond to the location of bosses 62. Each circuit board 68 is shown resting on flat portions 66, with triangular portions 64 fitting into notches 70. Solder (not shown) is then emplaced at the juncture of notches 70 and triangular portions 64. The use of triangular portions 64 in conjunction with notches 70 provides for better solder contact ad a wider range of tolerances when making the parts. Each circuit board 68 preferably includes conductive edge portions 72 which act as grounding busses as disclosed in U.S. Pat. No. 6,794,957 hereby incorporated by reference herein. Circuit boards 68 may have circuits on the top side, the bottom side, or on both sides. Each notch 70 is optionally plated through from the top side to the bottom side so that electrical connectivity is had directly via triangular portions 64 and notches 70, thus obviating reliance on the solder to form the electrical connection.

In this embodiment, interface ends 74, 76 are preferably one-piece with inner frame 60. A protective casing (not shown) such as protective casing 32 (FIG. 3) and optional O-rings (not shown) such as O-rings 42, 44 (FIG. 3) are preferably used to seal inner frame 60 and circuit boards 68.

Figure 9:
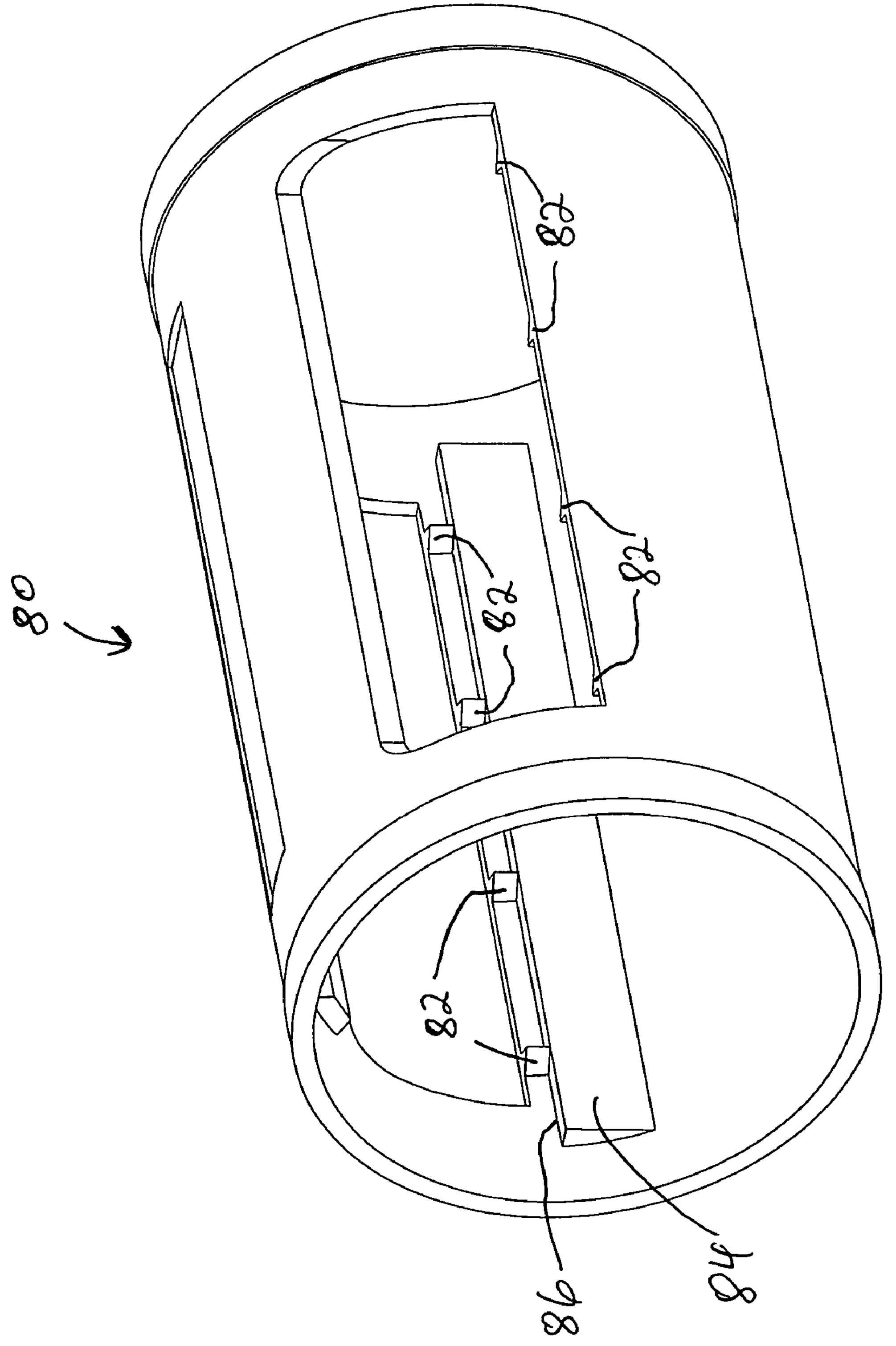
FIG. 9 shows a fourth embodiment of the present invention.

Referring to FIG. 9, a fourth embodiment of the invention is shown in which an inner frame 80 is adapted to permit changeable interface ends (not shown) as in the second embodiment. A plurality of triangular portions 82 serve the same function as triangular portions 64 in FIGS. 7-8. Instead of individual flat portions 66 as shown in FIGS. 7-8, a support ledge 84 with a flat face 86 provides support for circuit boards 68. Each boss in this embodiment thus includes one triangular portion 82 and an adjacent portion of flat face 86 of support ledge 84.

An additional function of support ledge 84 is to prevent solder from spilling into the interior of frame 80 or traveling along the underside of circuit boards 68 during assembly.

One of the features facilitated by the embodiments is having multiple grounding posts on the internal frame or housing which provide the ability to have short printed circuit traces to ground, thus minimizing parasitics.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An RF filter casing, comprising:

an internal frame;

first and second interface ends connected to the frame; and a protective casing connected to the internal frame and to the first and second interface ends;

the internal frame including a support structure for a plurality of bosses, wherein the plurality of bosses are effective for supporting a circuit board and for providing ground connection for at least one circuit on the circuit board;

wherein the internal frame contains no cross-members; and wherein the support structure of the internal flame is parallel to a longitudinal axis of the internal frame and the protective casing.

2. An RF filter casing according to claim 1, wherein the frame is one-piece with at least one of the first and second interface ends.

3. An RF filter casing according to claim 1, wherein the plurality of bosses includes at least six bosses.

4. An RF filter casing according to claim 1, wherein each of the plurality of bosses includes a triangular portion and a flat portion.

5. An RF filter casing according to claim 4, wherein the flat portions of the plurality of bosses are part of at least one support ledge.

6. An RF filter casing according to claim 1, wherein the support structure includes two beams extending axially from one end of the frame to another end of the frame.

7. An RF filter casing according to claim 1, wherein the first and second interface ends are connected to the frame by a press-fit connection between the protective casing, the frame, and the first and second interface ends.

8. An RF filter casing according to claim 1, further comprising an elastomeric seal between each of the first and second interface ends and the protective casing.

9. An RF filter casing, comprising:

support means for supporting a circuit board and for providing a ground connection for at least one circuit on the circuit board;

first and second interface means for electrically connecting the support means to external components; and protection means for protecting the at least one circuit from an external environment.

10. An RF filter casing according to claim 9, further comprising means for permitting tuning the at least one circuit on the circuit board.

11. An RF filter casing according to claim 10, further comprising means for minimizing a path length of ground traces on the circuit board.

12. An RF filter casing according to claim 11, further comprising means for mechanically and electrically connecting the first and second interface means, the support means, and the protection means to each other.

13. An RF filter casing according to claim 9, wherein the support means and at least one of the first and second interface means are one-piece.

14. An RF filter casing according to claim 9, wherein the protection means includes an elastomeric seal between each of the first and second interface means and a portion of the support means.

15. A method for assembling an RF filter casing, comprising the steps of:

providing an internal frame wherein the internal frame contains no cross-members;

providing a support structure as part of the internal frame, wherein the support structure of the internal frame is parallel to a longitudinal axis of the internal frame;

providing a plurality of bosses on the support structure of the internal frame;

providing two interface ends;

providing a protective outer casing; and when the internal frame and at least one of the interface ends are one-piece, press-fitting another of the interface ends and the protective outer casing onto the internal frame, such that mechanical and electrical connectivity is formed between the interface ends, the protective outer casing, and the internal frame;

and when the internal frame and both interface ends are one-piece, press-fitting only the protective outer casing onto the internal frame such that mechanical and electrical connectivity is formed between the interface ends, the protective outer casing, and the internal frame.

16. A method according to claim 15, wherein the plurality of bosses includes at least six bosses.

17. A method according to claim 15, wherein the support structure includes two beams extending axially along the frame.

18. A method according to claim 15, wherein the internal frame includes two support ledges extending axially along the frame.

19. A method according to claim 15, further comprising the step of providing an elastomeric seal between each of the first and second interface ends and the protective casing.

20. A method according to claim 15, further comprising the step of connecting two circuit boards to the support structure via the plurality of bosses, wherein the step of connecting includes soldering the circuit boards to the plurality of bosses.

* * * * *